United States Patent Office 2,762,451
Patented Sept. 11, 1956

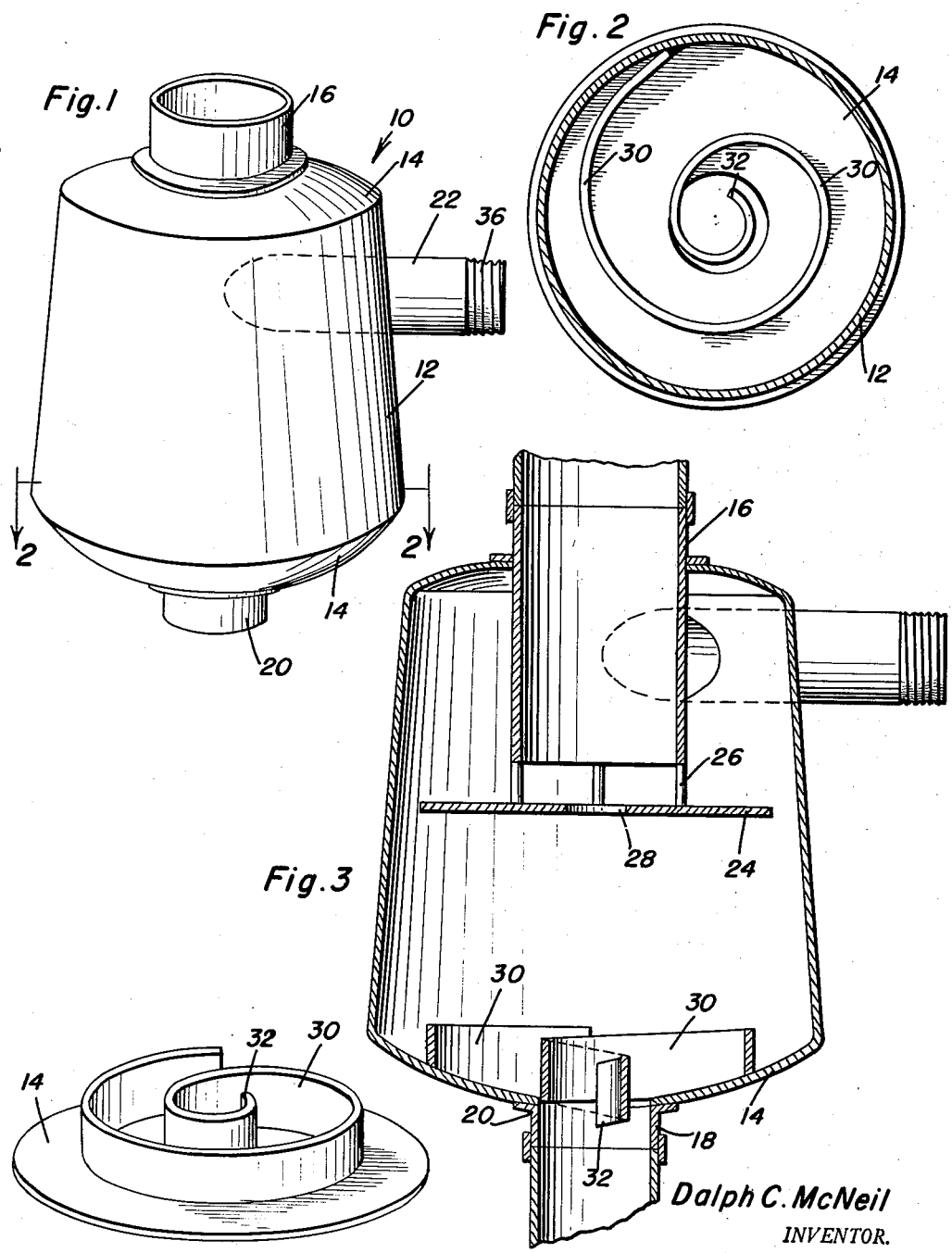

2,762,451

BLOW-DOWN SEPARATOR

Dalph C. McNeil, Brookville, Pa.

Application May 25, 1954, Serial No. 432,074

1 Claim. (Cl. 183—85)

This invention relates to a blow-down separator and specifically provides a separator for boilers or pressure vessels for efficiently and effectively separating elements having a relatively high velocity and different densities wherein one element has a tendency to flash from another element by virtue of the pressure release, such as boiler blow-down water and sludge from which steam flashes when pressure is reduced.

An object of this invention is to provide a blow-down separator which separates the steam from other elements such as water and sludge with a practical size and low noise level and yet retain efficient operation.

A still further object of this invention is to provide a blow-down separator which is simple in construction, easy to install, efficient in operation and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the blow-down separator of this invention;

Figure 2 is a top plan section taken substantially along section line 2—2 of Figure 1;

Figure 3 is a longitudinal, vertical section taken substantially along the center line of the structure of Figure 1; and Figure 4 is a perspective detail view showing the spiral baffle plate of the blow-down separator.

Referring now specifically to the drawings, it will be seen that the numeral 10 generally indicates the blow-down separator of this invention for use in separating two elements of varying densities and having a high velocity. It will be seen that the blow-down separator 10 includes a frusto-conical body or tank 12 having rounded upper end and lower end walls 14. A discharge tube 16 is secured to the upper end 14 and projects inwardly into the interior of the tank 12. A drain opening 18 having a pipe 20 secured thereto is positioned in the lower end wall 14. An inlet pipe 22 is secured to the cylindrical tank 12 adjacent the upper end thereof and in tangential relation to the tank 12. A circular baffle 24 is secured to the lower end of the tubular discharge 16 in spaced relation thereto by a plurality of spaced rods 26. An aperture 28 is positioned in the baffle 24 in alignment with the tubular discharge 16 for a purpose described hereinafter. It will be seen that the baffle 24 has a circumference which is smaller than the inside circumference of the tank 12 wherein the baffle 24 is spaced from the side walls of the tank 12 and from the end of the tubular discharge passage 16. A spiral baffle 30 is attached at the external end to the internal periphery of the tapered tank 12 while the lower edge of the spiral is attached to the bottom end wall 14 as the spiral spirals toward the center and drain 20. As the spiral breaks over the edge of the drain 20, it extends downward into the center of drain 20 a sufficient distance to overcome the tangential spin of the water and to direct it down into the center of the drain where a void would otherwise occur due to the vortex action.

From the foregoing construction, the operation of the device will be readily understood. The inlet passage 22 is connected by the threaded portion 36 to the boiler blow-down, and the velocity of the blow-down throws the blow-down around the internal periphery of the frusto-conical tank 12. The heavier material has a tendency to follow the shape of the periphery of the tank, and the lighter materials flash to the center where they exhaust through the outlet tube 16. As the blow-down leaves the inlet and comes in contact with the downwardly and outwardly tapering walls, the blow-down proceeds to a larger volume area where the lighter elements are separated more easily from the heavier material. The aperture 28 is for bleeding off the secondary flash, and the Venturi effect of the flash progressing from the tube 16 helps this secondary separation. The upstanding spiral baffle 30 collects the centrifugal heavier material and spins the flow quickly to the center opening 18 as much as the flow as possible breaks over the edge of opening 18 onto the internal periphery of drain 20. That part of the flow which cannot break over the edge as mentioned is carried by the spiral toward the center of the drain where otherwise would exist a vortex void. Throughout this center area, the extended lip 32 of the spiral extends into drain 20 about 1½ inches and directs the flow into the drain 20 center. Thus, with the entire area of opening 18 accommodating water, faster carryoff is experienced than would exist if natural spiral and water vortex action were permitted without a directing spiral baffle. The tank may be made of any suitable metal, ceramic or combination of other materials as desired. The arrangement of the double baffles together with the construction thereof resulting in more efficient separation of two materials of different density materially improves the utility of separators of this type.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A blow-down separator comprising a downwardly and outwardly tapering hollow frusto-conical body having generally convex top and bottom closures of integral construction, said top having a discharge tube extending downwardly therethrough and terminating adjacent the center of said body, said body having a tangential inlet passage adjacent the top and disposed above the lower end of the discharge tube, a circular baffle plate disposed adjacent the center of the body in concentric spaced relation, a plurality of circumferentially spaced rods extending longitudinally from the lower end of the discharge tube, said rods being connected to said baffle plate for supporting the plate in spaced relation to the lower end of the tube, said baffle plate having a central aperture of smaller diameter than the discharge tube in alignment therewith, said bottom having a drain opening disposed centrally therein, and a single continuous upstanding spiral baffle disposed on the inner surface of the bottom, the outer end of the spiral baffle being attached to the inner surface of the body, the inner terminal end of said spiral baffle extending downwardly through said discharge opening for guiding material therethrough, said inner end of the spiral baffle extending into the discharge opening a distance sufficient to overcome the centrifugal force of liquid passing through the spiral baffle, the flash of gases between the plate and tube and upwardly through the tube forming a Venturi effect for drawing additional gases through the baffle plate.

References Cited in the file of this patent

UNITED STATES PATENTS

| | | |
|---|---|---|
| 568,536 | Joy | Sept. 29, 1896 |
| 772,689 | Allington | Oct. 18, 1904 |
| 1,170,438 | Fahrney | Feb. 1, 1916 |
| 1,262,076 | Marston | Apr. 9, 1918 |
| 1,427,446 | Denoel | Aug. 29, 1922 |
| 2,010,128 | Arnold | Aug. 6, 1935 |
| 2,179,919 | Carr et al. | Nov. 14, 1939 |
| 2,191,190 | De Guire | Feb. 20, 1940 |
| 2,539,019 | Hill | Jan. 23, 1951 |

FOREIGN PATENTS

| | | |
|---|---|---|
| 21,218 | Great Britain | Nov. 22, 1892 |
| 180,922 | France | Jan. 15, 1887 |